3,539,306
PROCESS FOR THE PREPARATION
OF HYDROTALCITE
Teruhiko Kumura and Norio Imataki, Takamatsu-shi, Katuyuki Hasui, Kagawa-ken, and Takeo Inoue and Kimiaki Yasutomi, Nagao-machi, Kagawa-ken, Japan, assignors to Kyowa Chemical Industry Co., Ltd., Tokyo, Japan, a corporation of Japan
No Drawing. Filed July 21, 1967, Ser. No. 654,977
Claims priority, application Japan, July 25, 1966, 41/48,349; July 17, 1967, 42/45,658
Int. Cl. C01f 5/00, 7/00; A61k 27/06
U.S. Cl. 23—315                                    4 Claims

ABSTRACT OF THE DISCLOSURE

A process for the preparation of hydrotalcite which comprises mixing an aluminum component such as aluminum salt with a magnesium component such as magnesium salt in an aqueous medium in the presence of carbonate ion at a pH of at least 8 and thereafter recovering the resultant product. An antacid or an excipient comprising hydrotalcite of the general formula $$Al_2O_3 \cdot 6MgO \cdot CO_2 \cdot 12H_2O$$

This invention relates to a novel method of synthesis of hydrotalcite, and to the gastric anacid and excipient containing the said hydrotalcite.

The ideal gastric antacid is required to meet the following conditions: that it should show the maximum neutralising effect in the possible shortest time to such an extent that it raises the pH of gastric juice to around 3 within one minute after administration; it should neutralise an adequate amount of gastric hydrochloric by maintaining the pH of gastric juice to 3–5 during the normal period of gastric digestion; any excess, however great, should not cause alkalisation of gastric juice nor constipation, diarrhea or alkalosis to the patient; and that its acid consuming capacity should not be impaired by pepsin nor affected by moisture or temperature.

Heretofore the researches for such antacid meeting the above requirements have been centered on aluminum hydroxide. However, while aluminum hydroxide gel immediately after its preparation is amorphous under X-ray examination and highly reactive with acid and furthermore its acid consuming capacity is little damaged by pepsin, with the time lapse or when it is made into dry product its reactivity with acid falls and its acid consuming capacity tends to be more appreciably damaged by pepsin. Also many of the products of this type crystallize. With the purpose to prevent or control such phenomena, it has been proposed to add to the aluminum hydroxide gel such matter as organic acid, amino acid, protein, saccharide and the like, or to co-precipitate with the aluminum hydroxide gel calcium carbonate, magnesium carbonate, silicic acid and the like. These methods however are objectionable in that since the substances having no acid consuming capacity or those which impair acid consuming capacity are whereby added, the products have lowered acid consuming capacity per gram and furthermore become more expensive. Also in most cases those methods fail to satisfactorily overcome the decrease in the reactivity with acid of aluminum hydroxide gel with the time lapse.

For these reasons, an antacid having quick-appearing and sustaining effect as well as excellent storability has been strongly demanded.

Whereas, we found that hydrotalcite which itself is a stable, crystalline substance possesses desired combined properties of quick activity, durable effect and storage stability, and that, therefore, the same can provide an excellent, ideal antacid.

Hydrotalcite is known as a mineral having a chemical structure of the formula $$Mg_6Al_2(OH)_{16}CO_3 \cdot 4H_2O \text{ or } Al_2O_3 \cdot 6MgO \cdot CO_2 \cdot 12H_2O$$

which has been naturally produced in only very limited areas as Norway and Ural. Also a process for the synthesis of hydrotalcite was disclosed, which comprises adding Dry Ice or ammonium carbonate to a mixture of magnesium oxide and γ-alumina or the thermal decomposition product from of magnesium nitrate and aluminum nitrate, and thereafter maintaining the system at temperatures below 325° C. and under elevated pressures of total 2,000–20,000 p.s.i. (Roy et al.: American Journal of Science 251, 350–353 (1953)). However this process is obviously unpractical for industrial scale production of hydrotalcite, because the reaction system must be maintained under considerably high pressures. Whereas, we now found a process by which hydrotalcite can be synthesized with industrial ease without requiring such high pressures.

Accordingly, the object of the present invention is to provide a novel process by which synthetic hydrotalcite can be industrially produced from readily available starting material without especially complicated operations.

An another object of the invention is to provide a novel gastric antacid containing hydrotalcite, which has excellently quick activity, durable effect and storage stability.

Still another object of the invention is to provide a novel excipient for pharmaceutical and other chemical industrial use containing hydrotalcite, which is excellent in such properties as compressibility as well as hardness and compression strength after the shaping.

Further objects and advantages of the invention will become apparent upon reading the following descriptions.

According to the invention, there is provided a process for the preparation of hydrotalcite which comprises mixing an aluminum component with a magnesium component in an aqueous medium in the presence of carbonate ion at a pH of at least 8 and thereafter, recovering the resultant precipitate, the said aluminum component being selected from a group consisting of aluminum hydroxide, basic aluminum carbonate, aluminum hydroxide-alkali carbonate, complex, aluminum aminoacid salt, aluminum alcoholate, water-soluble aluminum salt, and water-soluble aluminate, and the said magnesium component being selected from a group consisting of magnesium oxide, magnesium hydroxide, magnesium carbonate and water-soluble magnesium salt.

The aluminum component to be employed in the invention may be any member of the group consisting of aluminum hydroxide, basic aluminum carbonate, aluminum hydroxide-alkali carbonate complex, aluminum aminoacid salt, aluminum alcholate, water-soluble aluminum salt and water-soluble aluminate. As examples of aluminum hydroxide-alkali carbonate complex, those prepared in accordance with the processes disclosed in U.S. Pats. Nos. 2,783,124, 2,783,127 and 2,783,179 may be used. As water-soluble aluminum salt, aluminum salts of acids such as aluminum sulphate, aluminum chloride, aluminum nitrate and aluminum acetate, and their complex salt such as alum can be used, and as the water-soluble aluminate, there can be used an alkali aluminate such as sodium aluminate. Obviously, in accordance with the invention it is permissible to form aluminum hydroxide, aluminum hydroxide-alkali carbonate complex, basic aluminum carbonate or aluminum aminoacid, salt in situ, preceding the described reaction.

As the magnesium component which is the other reactant, any member of the group consisting of magnesium oxide, magnesium hydroxide, magnesium carbonate and water-soluble magnesium salt may be used. As the water-soluble magnesium salt, there can be mentioned mineral acid salts of magnesium such as magnesium chloride, magnesium nitrate, magnesium sulphate, magnesium dicarbonate and bittern.

According to this invention, the said aluminum component is mixed with the magnesium component in a basic aqueous medium in the presence of carbonic acid ion. To increase the yield of the hydrotalcite at this time, it is preferable to mix the aluminum component with the magnesium component so that the atomic ratio of Al to Mg may be 1:2/3–8, and to cause the carbonic ion to be present in a ratio of at least 1/9 to each aluminum atom. Of course, it is most preferable to react the coponents in stoichiometrical amounts. In that occasion, the difficulty water-soluble aluminum component such as aluminum hydroxide, basic aluminum carbonate, aluminum aminoacid salt and aluminum hydroxide-alkali carbonate complex, or the difficulty water-soluble magnesium component such as magnesium oxide, magnesium hydroxide and magnesium carbonate can be added to the aqueous medium as they are, or as liquid suspension. On the other hand, when water soluble aluminum salt and/or water-soluble magnesium salt are used, it is preferred to add those salts to the aqueous medium in the form of aqueous solution.

According to a preferred embodiment of the invention, the mixing is performed to make the pH of the entire system composed of the aluminum component, magnesium component and aqueous medium at least 8, inter alia, above 9.5. With the pH of the entire system below 8, the object hydrotalcite is obtainable only at low yield. In order to maintain the pH of the entire system at the said level during the reaction, alkaline substances such as alkali hydroxide and/or alkali carbonate may be suitably added to the aqueous medium, when water-soluble aluminum salt and/or water-soluble magnesium salt is used.

The required presence of carbonate ion in the reaction system can be effected by blowing carbon dioxide gas into the system or by addition of a carbonate. Obviously such procedure may be omitted when an aluminum hydroxide-alkali carbonate complex is used as the aluminum component or magnesium carbonate, as the magnesium component, since in those cases the reaction system will contain the sufficient amount of carbonate ion. Also when water-soluble aluminum salt and/or water-soluble magnesium salt is used, it is convenient to use the combination of alkali carbonate and alkali hydroxide as the carbonate, because whereby control of pH of the reaction system and the carbonate ion supply can be achieved by single operation.

The critical feature of the invention resides in that the reaction of the aluminum component, magnesium component and carbon dioxide is performed in water and under basic condition. Because the reaction of the three is performed in water according to the invention, it is made possible to provide carbon dioxide in the form of carbonate ion, and consequently mild reaction conditions with respect to pressure and temperature become feasible.

The temperature conditions for the reaction vary considerably depending on the types of the aluminum component and magnesium component employed, but normally the range of 0°–150° C. is preferred. The reaction time also to some extent is a dependent factor on reaction temperature and specific types of the starting materials. For instance, if a difficulty water-soluble substance is used as at least one of the starting materials, it is preferable to effect heating to a temperature above 40° C., and above 50° C. to accelerate the reaction rate. The reaction time is shorter as a higher heating temperature is used, but if starting materials having a good reactivity are chosen, hydrotalcite is formed within 10 minutes even if the temperature is around 50° C. When water-soluble materials alone are used, reaction takes place instantaneously at a temperature ranging from 0 to 150° C.

According to the invention, as the hydrotalcite formed is obtained in the form of precipitate, the product is filtered, washed with water if desired and thereafter the solid is separated by known solid-liquid separation means such as centrifuge, followed by drying to serve as the dry product.

In a preferred embodiment of the invention, a water-soluble aluminm salt and a water-soluble magnesium salt are mxed to form a homogeneous aqueous solution, and the system was added with alkali hydroxide and carbonate ion by means of addition of alkali carbonate solution or blowing-in of carbon dioxide gas. Thereafter the system was mixed, and the resultant precipitate was filtered, washed with water and dried to provide the desired product. If the ratio of Al to Mg deviates from 1:3 at this time, it is possible to produce hydrotalcite having less impurities, because excessive reactant remain in the solution.

In accordance with the above embodiment, because the reaction progresses in a homogeneous system the reaction conditions can be controlled with ease, and furthermore there is another advantage in that the entire procedure can be practiced continuously by supplying continuously from one end the aluminum componet, magnesium component, basic component and carbonate component and concurrently withdrawing continuously from the other end of the slurry of the formed hydrotalcite.

In another embodiment of the invention wherein aluminum hydroxide is used as the aluminum component, an aqueous slurry of aluminum hydroxide is added with neutral magnesium carbonate, and the system is heated at such temperature for such time as sufficient to cause disappearance of the magnesium carbonate crystals which can be confirmed by microscopic observation of the sample taken desired hydrotalcite is formed. And, when neutral magnesium carbonate in the above process is replaced by basic magnesium carbonate, the heating to slightly elevated temperatures is sufficient, and without further positive heating during the reaction hydrotalcite can be obtained by considerably prolonged drying of the product. In the foregoing two methods, the formed products do not contain soluble impurities and therefore need not be washed with water.

According to still another embodiment of the invention, hydrotalcite is formed by either addition of alkali carbonate (including alkali bicarbonate) or blowing-in of carbon dioxide gas, to a slurry of aluminum hydroxide and magnesium oxide or magnesium hydroxide. In that case the mol ratio of alkali carbonate to aluminum hydroxide should preferably be no less than 1:1. If the concentration of the suspension is smaller, it is necessary to make the molar ratio of alkali carbonate larger. The preferred reaction temperature is above 45° C., it being the case the higher the temperature, the better for hydrotalcite formation. Also alkali bicarbonate is preferred over neutral alkali carbonate. Basic aluminum carbonate can similarly be used in place of the said aluminum hydroxide.

In another embodiment of the invention, aluminum hydroxide-alkali carbonate complex or aluminum aminoacid salts and magnesium oxide or hydroxide are mixed as an aqueous slurry. Because aluminum hydroxide-alkali carbonate complex and aluminum aminoacid salts are highly stable compared with aluminum hydroxide, the use of the complex is advantageous in that the selection of reaction conditions becomes easier. For instance, in the practice of passing carbon dioxide gas through a suspension containing aluminum hydroxide and magnesium oxide or hydroxide, it is preferred to cause the absorption of carbon dioxide gas at low temperatures and thereafter heating the system to 70° C. or above, in consideration of the fact that a part of aluminum hydroxide loses reactivity upon heating. When the carbon dioxide gas above 50° C., such care is desirable to employ an aluminum hydroxide which is particularly stable under high temperatures, or to shorten the duration of high temperature treatment. In contrast thereto, when aluminum hydroxide-alkali carbonate complex or aluminum aminoacid salt are used, the reaction is performed with ease by passing carbon dioxide gas through a suspension containing the complex and magnesium hydroxide or oxide with heating at the temperatures ranging from 50° C. to that below the boiling point.

Besides the afore-described embodiments, it should be obvious to the experts that, as either of the aluminum or magnesium components, an aqueous solution of the water-soluble salt may be used. In any of the embodiments, however, it is essential that the reaction among the aluminum component, magnesium component and carbon dioxide is performed in water at the pH of basic side.

The so obtained hydrotalcite has a structure represented by the general formula below.

$$Al_2O_3 \cdot 6MgO \cdot CO_2 \cdot 12H_2O$$

The characteristic values of the hydrotalcite of the invention and those of natural hydrotalcites (ASTM card No. 14–191) as obtained from the results of X-ray diffraction analysis are given in Table 1 below, in which $d$ means the spacing of the crystal.

TABLE 1

| Hydrotalcite according to ASTM card, $d$. A.: | Product of the invention, $d$. A. |
|---|---|
| 7.69 | 7.75 |
| 3.88 | 3.89 |
| 2.58 | 2.59 |
| 2.30 | 2.30 |
| 1.96 | 1.96 |
| 1.53 | 1.53 |
| 1.50 | 1.50 |

In spite of its high magnesium content, the hydrotalcite obtained in the invention gives a pH of 9.0–8.4 when 1 g. thereof is suspended in 50 ml. of water, and that of 5–6 when 2 g. thereof is thrown into 100 ml. of N/10 hydrochloric acid. Also when 1 g. thereof is thrown into 150 ml. of artificial gastric juice (0.068 N hydrochloric acid) and stirred for 10 minutes, thereafter the artificial gastric juice is added to the system continuously at the rate of 2 ml./min., the pH of the system reaches 3.0 within 10–30 seconds. The maximum pH is about 4.1, and the duration of pH above 3.0 is about 2.5 hours. These data substantiate the appropriety of the product of the invention as an antacid. Again the above effects were not changed when pepsin was added to the artificial gastric juice, or the hydrotalcite was heated for 3 hours in boiling water. The results of testing the acid consuming capacity of the hydrotalcite of the invention and of known antacid in the artificial gastric juice in accordance with the above method are given in Table 2 below.

TABLE 2

| Antacids | Acid consuming capacity | (Sec.)[1] | Maximum pH | (min.)[2] |
|---|---|---|---|---|
| Hydrotalcite | 278 | 12 | 4.15 | 139 |
| Hydrotalcite (boiled for one hour) | 278 | 13 | 4.10 | 138 |
| Aluminum hydroxide dried gel | 296 | 300 | 3.8 | 119 |
| Calcium carbonate | 195 | 9 | 5.8 | 78 |
| Magnesium carbonate | 207 | 10 | 7.6 | 87 |
| Sodium bicarbonate | 119 | 3 | 6.2 | 23 |
| Dihydroxyaluminum aminoacetate | 175 | 60 | 3.8 | 53 |
| Magnesium carbonate aluminum hydroxide co-dried gel | 286 | 36 | 3.8 | 120 |
| Magnesium carbonate aluminum hydroxide co-dried gel (boiled for one hour) | 210 | 1,530 | | |
| Magnesium trisilicate | 104 | 480 | 3.7 | 12 |

[1] Time required for the gastric juice to reach a pH of 3.0
[2] Time required for the gastric juice to reach a pH below 3.0.

Thus, it should be apparent that the hydrotalcite of this invention can provide an antacid which is excellent in its prompt but lasting neutralising action, and is never impaired by a long time storage and that it can exhibit said excellent neutralising action as well as its acid consuming capacity even after it has been boiled, while the conventional antacid such as magnesium carbonate aluminum hydroxide codried gel, loses almost its capacity after one hour's boiling. Of course the antacid of the invention may suitably contain, besides the hydrotalcite, aluminum hydroxide, magnesium carbonate, calcium carbonate, magnesium hydroxide, aluminum hydroxide-alkali carbonate complex, silicate and the like. Such antacid comprising hydrotalicite and the foregoing substances can be prepared by mixing the latter with hydrotalcite or coprecipitating hydrotalcite with the substance or substances by reacting the starting materials for the hydrotalcite in the presence of a suitable amount of the foregoing substances or of the starting materials for such substances.

Furthermore, the hydrotalicite of the insibility when made into tablet, and the compressed hydrotalcite has excellent hardness and compression strength. For these reasons it is highly useful as an excipient for tablet in the pharmaceutical field and in other chemical industries.

The relation between the hardness and compression pressure in hydrotalcite of the present invention and known excipients is shown in Table 3 below.

TABLE 3.—COMPRESSION PRESSURE—HARDNESS

| Compression pressure (kg./cm.²) | Hardness (kg./cm.²) | | | |
|---|---|---|---|---|
| | Hydrotalcite | Aluminum hydroxide dried gel | Crystalline lactose | Microcrystalline cellulose |
| 318 | 14.2 | 2.4 | 0 | 12.3 |
| 636 | Over 25 | 6.0 | 0 | 19.8 |
| 955 | Over 25 | 11.2 | 0.9 | Over 25 |
| 1,274 | Over 25 | 16.8 | 1.8 | Over 25 |
| 1,911 | Over 25 | Over 25 | 2.8 | Over 25 |
| 2,548 | Over 25 | Over 25 | 5.8 | Over 25 |

It is clear from the above table that the hydrotalcite of the present invention can give tablets sufficient hardness at a lower pressure than the known excipients.

The invention will now be described with reference to the following Examples.

EXAMPLE 1

6.86 liters of an aqueous suspension containing aluminum hydroxide in the amount corresponding to 102 g. of alumina, 350 g. of magnesium hydroxide and 420 g. of sodium bicarbonate was heated to 85° C. with agitation, and maintained at the said temperature for 3 hours. Thereafter the system was filtered to separate the mother liquor, and the solid was washed with 21 liters of water and dried at 70° C. to provide 650 g. of the product. The reaction formula, and the analysis value ($MgO:Al_2O_3:CO_2$ in terms of mol ratio) and the acid consuming capacity of the product were as follows:

$$2Al(OH)_3 + 6Mg(OH)_2 + NaHCO_3 + 3H_2O$$
$$\rightarrow Mg_6Al_2(OH)_{16}CO_3 \cdot 4H_2O + NaOH$$

| | Molar ratio | |
|---|---|---|
| | Measured value | Calculated value |
| MgO | 6.05 | 6.00 |
| $Al_2O_3$ | 1.00 | 1.00 |
| $CO_2$ | 1.42 | 1.00 |
| Acid consuming capacity, ml. | 279 | |

Note.—The acid consuming capacity is expressed by number of ml. of 0.1 N hydrochloric acid required to neutralize 1 g. of the product.

EXAMPLE 2

To an aqueous suspension of aluminum hydroxide-sodium carbonate complex containing 51 g. of aluminum component as alumina (0.5 mol) and 75.5 g. of carbonate ion source as sodium bicarbonate (0.9 mol), 122 g. (3 mols) of magnesium oxide was added to make the total of 3.5 liters of the suspension. The same was heated to 85° C. with agitation for 2 hours and filtered. The solid was washed with water and dried to provide 330 g. of the product. The reaction formula and the analysis valve and acid consuming capacity of the product were as follows:

$$Al(OH)_3 \cdot NaHCO_3 + 6MgO + 8H_2O$$
$$\rightarrow Mg_6Al_2(OH)_{16}CO_3 \cdot 4H_2O + Na_2CO_3$$

| | Molar ratio |
|---|---|
| MgO | 6.00 |
| $Al_2O_3$ | 1.00 |
| $CO_2$ | 1.16 |

Acid consuming capacity, 269 ml.

EXAMPLE 3

Aluminum sulfate in the amount corresponding to 17 g. of alumina was used to make 1 liter of a solution, and 106 g. of sodium carbonate was also made into 1 liter of a solution, which were then poured into a suspension formed of 60 g. of magnesium hydroxide suspended in 0.4 liter of water at a constant flow rate with agitation. Thereafter the suspension was washed with water until presence of sulfate radical became no more observable, and again suspended in water. After 3 hours of heating at 85° C., the system was dehydrated and dried to provide 110 g. of the product. The reaction formula, and the analysis value and acid consuming capacity of the product were as follows:

$$6Mg(OH)_2 + Al_2(SO_4)_3 + 3Na_2CO_3 + 8H_2O$$
$$\rightarrow Mg_6Al_2(OH)_{16}CO_3 \cdot 4H_2O + 3Na_2SO_4 + 2H_2CO_3$$

| | Molar ratio |
|---|---|
| MgO | 6.00 |
| $Al_2O_3$ | 1.00 |
| $CO_2$ | 1.17 |

Acid consuming capacity, 272 ml.

EXAMPLE 4

To aluminum hydroxide in the amount corresponding to 25.5 g. of alumina, an aqueous solution containing 120 g. of caustic soda was added to make a total of 1 liter of a solution with agitation. The same was mixed under agitation with 3 liters of magnesium chloride solution of which solid content corresponding to 60.5 g. of magnesia and whereby reacted while carbon dioxide gas was introduced into the system. After the reaction the precipitate was filtered, washed with water and dried to provide 160 g. of the product. The analysis value and the acid consuming capacity of the product were as follows:

| | Molar ratio |
|---|---|
| MgO | 5.85 |
| $Al_2O_3$ | 1.00 |
| $CO_2$ | 1.04 |

Acid consuming capacity, 280 ml.

EXAMPLE 5

Aluminum sulphate and magnesium chloride were dissolved into water to make a solution containing 10.2 g. of $Al_2O_3$ and 24.2 g. of MgO per liter. Separately, a solution containing 40 g. of caustic soda and 35 g. of sodium carbonate per liter was prepared. The former solution and the latter solution were continuously poured, while stirring, into a reaction vessel which was adapted to overflow with the amount of liquid maintained at 1.2 liters, in an amount of 16.7 ml./min. and 25 ml./min. respectively. The pH of the reacted suspension was 10.4. After three hours' pouring at room temperature, the reacted suspension was collected, washed with 6 liters of water, and dried at a temperature not higher than 150° C. to give 210 g. of a final product.

The analytical values and acid consuming capacity are as follows:

| | Molar ratio |
|---|---|
| MgO | 5.98 |
| $Al_2O_3$ | 1.00 |
| $CO_2$ | 1.43 |

Acid consuming capacity, 258 ml.

EXAMPLE 6

Basic aluminum carbonate containing 34 g. of $Al_2O_3$ and basic magnesium carbonate containing 13.4 g. of MgO, and magnesium hydroxide containing 67.2 g. of MgO were suspended into water to make 2 liters of a suspension. The suspension was heated to 85° C. Immediately, the reacted suspension was dehydrated and dried to give 213 g. of a final product.

The analytical values and acid consuming capacity are as follows:

| | Molar ratio |
|---|---|
| MgO | 5.85 |
| $Al_2O_3$ | 1.00 |
| $Co_2$ | 1.05 |

Acid consuming capacity, 275 ml.

EXAMPLE 7

One hundred grams of dihydroxyaluminum aminoacetate containing 35.0% of $Al_2O_3$ and 100 g. of magnesium hydroxide containing 83 g. of MgO were suspended into water to make 1.5 liters of suspension. It was put into an autoclave and heated while stirring. After having been maintained at a temperature of 120° C. for 20 minutes, the suspension was washed with water, dehydrated, and dried to give 212 g. of a final product.

The analytical values and acid consuming capacity are as follows:

| | Molar ratio |
|---|---|
| MgO | 5.90 |
| $Al_2O_3$ | 1.00 |
| $CO_2$ | 1.33 |
| N | percent 0.01 |

Acid consuming capacity, 286 ml.

What is claimed is:

1. A process for the preparation of hydrotalcite consisting essentially of a product of the formula:

$$Al_2O_3 \cdot 6MgO \cdot CO_2 \cdot 12H_2O$$

which comprises mixing (A) an aluminum component selected from aluminum hydroxide, aluminum amino acid salts, aluminum alcoholate, water-soluble aluminates, aluminum nitrate, and aluminum sulphate, (B) a magnesium component selected from magnesium oxide, magnesium hydroxide, and water-soluble magnesium salts, and (C) an alkali carbonate or an alkali bicarbonate, in an aqueous medium at a temperature of from 0 to 150° C. at a pH of at least 8, in a ratio in terms of $Al_2O_3$:MgO of substantially 1:6 and recovering the precipitated product.

2. The process of claim 1, wherein the carbonate ion is present in a ratio of at least 1:9 to each aluminum atom.

3. The process of claim 1, wherein the pH of the aqueous medium is at least 9 at the completion of the reaction.

4. A process for the preparation of hydrotalcite consisting essentially of a product of the formula:

$$Al_2O_3 \cdot 6MgO \cdot CO_2 \cdot 12H_2O$$

which comprises mixing an aluminum component selected from basic aluminum carbonate and aluminum hydroxide-alkali metal carbonate complexes, with a magnesium component selected from magnesium oxide, magnesium hydroxide, neutral and basic magnesium carbonates and water-soluble magnesium salts, in an aqueous medium at a temperature of from 0 to 150° C. at a pH of at least 8, in a ratio in terms of $Al_2O_3$:MgO of substantially 1:6 and in terms of carbonate ion: aluminum of at least 1:9, and recovering the precipitated product.

References Cited

UNITED STATES PATENTS 2,958,626   11/1960   Schenck et al. _____ 23—315

OSCAR R. VERTIZ, Primary Examiner

H. S. MILLER, Assistant Examiner

U.S. Cl. X.R.

424—154